United States Patent

(12) United States Patent
Moon

(10) Patent No.: US 10,556,208 B2
(45) Date of Patent: Feb. 11, 2020

(54) VACUUM BLENDER

(71) Applicant: NuWave, LLC, Libertyville, IL (US)

(72) Inventor: Jung S. Moon, Long Grove, IL (US)

(73) Assignee: NUWAVE, LLC, Libertyville, IL (US)

( * ) Notice: Subject to any disclaimer, the term of this patent is extended or adjusted under 35 U.S.C. 154(b) by 81 days.

(21) Appl. No.: 15/866,112

(22) Filed: Jan. 9, 2018

(65) Prior Publication Data
US 2018/0326378 A1   Nov. 15, 2018

Related U.S. Application Data

(60) Provisional application No. 62/443,874, filed on Jan. 9, 2017.

(51) Int. Cl.
| B01F 13/06 | (2006.01) |
| B01F 7/16 | (2006.01) |
| B01F 15/00 | (2006.01) |
| A47J 43/046 | (2006.01) |
| A47J 43/07 | (2006.01) |
| B01F 13/04 | (2006.01) |

(52) U.S. Cl.
CPC .............. B01F 13/06 (2013.01); A47J 43/046 (2013.01); A47J 43/0777 (2013.01); B01F 7/162 (2013.01); B01F 13/047 (2013.01); B01F 15/00253 (2013.01); B01F 15/00538 (2013.01); *B01F 2015/00097* (2013.01); *B01F 2215/0026* (2013.01)

(58) Field of Classification Search
CPC ... A47J 43/046; A47J 43/0777; B01F 13/047; B01F 13/06; B01F 15/00253; B01F 15/00538; B01F 2015/00097; B01F 2215/0026; B01F 7/162
See application file for complete search history.

(56) References Cited

U.S. PATENT DOCUMENTS

| 4,042,221 | A | * | 8/1977 | Myers | ..................... B01F 7/161 366/146 |
| 4,577,973 | A | * | 3/1986 | Occelli | ................. B01F 7/1695 141/8 |
| 4,648,719 | A | * | 3/1987 | Roben | ..................... B01F 7/162 241/46.17 |
| 5,505,538 | A | * | 4/1996 | Earle | ................... B01F 13/0016 366/139 |
| 5,533,797 | A | * | 7/1996 | Gelber | .................... A47J 43/07 206/320 |
| 5,957,577 | A | * | 9/1999 | Dickson | .................. A47J 43/07 366/197 |

(Continued)

*Primary Examiner* — Tony G Soohoo
(74) *Attorney, Agent, or Firm* — Bishop, Diehl & Lee, Ltd.

(57) ABSTRACT

A vacuum blender having the ability to reduce oxidation of ingredients for a more nutrient-rich product. The blender includes a container for holding ingredients to be blended, the container being open at a top end and having blender blades at a lower end, a lid for covering the open end of the container, and a base having a motor contained therein for driving the blender blades, an interface for coupling with the blender blades of the container, a vacuum system for effecting a vacuum to the container and electronic controls for operating the motor and vacuum system. The vacuum system is configured to couple with the lid to draw a vacuum from the top of the container when activated.

18 Claims, 13 Drawing Sheets

(56) References Cited

U.S. PATENT DOCUMENTS

| | | | |
|---|---|---|---|
| 6,571,908 B2* | 6/2003 | Bohannon | A47J 43/0716 160/201 |
| 7,520,663 B1* | 4/2009 | Kolar | A47J 43/07 312/326 |
| 8,087,603 B2* | 1/2012 | Kolar | A47J 43/0716 181/198 |
| 9,675,212 B2* | 6/2017 | Hewitt | A47J 43/0727 |
| 9,930,986 B2* | 4/2018 | Arai | A47J 43/046 |
| 9,950,301 B2* | 4/2018 | Ruberg | B01F 13/0098 |
| 9,999,319 B2* | 6/2018 | Kim | A47J 43/0716 |
| 10,299,630 B2* | 5/2019 | Chung | A47J 43/046 |
| 10,299,632 B2* | 5/2019 | Vu | A47J 43/0716 |
| 10,321,786 B2* | 6/2019 | Kim | A47J 43/0716 |
| 2004/0173105 A1* | 9/2004 | Kim | A47J 43/06 99/472 |
| 2017/0202397 A1* | 7/2017 | Vu | A47J 43/0716 |
| 2017/0202398 A1* | 7/2017 | Vu | A47J 43/0716 |
| 2017/0231431 A1* | 8/2017 | Maeng | A47J 43/046 99/485 |
| 2018/0098666 A1* | 4/2018 | Lee | A47J 43/0716 |
| 2018/0199762 A1* | 7/2018 | Kim | A47J 43/0716 |
| 2018/0220829 A1* | 8/2018 | Zhang | A47J 19/02 |
| 2018/0310769 A1* | 11/2018 | Kim | A47J 43/046 |
| 2018/0326378 A1* | 11/2018 | Moon | B01F 15/00253 |

* cited by examiner

VACUUM BLENDER

RELATED APPLICATION

The following disclosure hereby claims the filing priority of U.S. Provisional Application No. 62/443,874, titled "VACUUM BLENDER" and filed on Jan. 9, 2017. The '874 application is hereby incorporated by reference.

TECHNICAL FIELD OF THE INVENTION

The present invention relates to food and drink blenders. More specifically, the invention relates to a vacuum food and drink blender which not only blends ingredients but reduces oxidation during blending to improve food quality.

BACKGROUND OF THE INVENTION

A health trend which continues to gain significant traction with consumers is vitamin and/or nutrient-rich smoothies and the like. Originally such healthy drinks were only available through specialty stores due to the required use of expensive high-speed blenders. As the price of the blenders dropped, more and more health-conscious people began blending fruits, vegetables and other ingredients for a vitamin and nutrient-rich drink right from home. In fact, the trend did not stop at health drinks, but expanded into blending healthier mixes, foods and drinks of all kinds.

However, it is widely known that a loss of nutrients occurs in foods, including blended drinks, as a result of reactions with oxygen in the air (i.e., oxidation). Research has found that this damaging reaction is increased during high-speed blending. Once this oxidation occurs, it cannot be reversed and the loss of valuable nutrients is permanent.

Further, with the addition of multiple ingredients to a blender container, air tends to push the contents downward. If this occurs too quickly, as it often does in high-speed blending, it can cause clumping and result in uneven blending of the contents.

These undesired effects can be controlled, if not eliminated, with the removal of air from the container before blending as well as with the use of a proper blender blade. Accordingly, removing air from the blender container before blending helps eliminate oxidation and clumping. That is, by removing air from the container, existing nutrients will be prevented from oxidation and the materials within the container will expand, resulting in a finer processing of the ingredients.

Until the invention of the present application, these and other problems in the prior art went either unnoticed or unsolved by those skilled in the art. The present inventive blender provides a vacuum, a unique blade and other features which not only remove air from the blender container, but allows the user to create a better blended product without sacrificing taste, and without a significant loss of valuable nutrients.

SUMMARY OF THE INVENTION

There is disclosed herein an improved vacuum blender which avoids numerous disadvantages of prior devices while affording additional structural and operating advantages.

Generally speaking, the vacuum blender comprises a container for holding ingredients to be blended, a lid for covering an open end of the container, and a base having a motor and a vacuum system contained therein. The base motor and vacuum system drive a blender blade and draw a vacuum within the container, respectively.

More specifically, a preferred embodiment of the vacuum blender comprises the container having a lid configured to completely cover an open end of the container, the lid having a first aperture on a first surface of the lid and a second aperture on a second surface of the lid, the first and second apertures being fluidly connected by an air passage through the lid, as well as a base unit comprising a motor, an interface positioned on a outer surface of the base unit for engaging the bottom surface of the container during use, the interface having a connector driven by the motor and configured to couple with the shaft when the container is properly positioned on the interface, an extending section configured to engage the lid during use, a vacuum system for effecting a vacuum within the container, the vacuum system comprising a vacuum pump and an air line connected by one end to the pump and having a connector attached at an opposing end, wherein the connector is positioned within the extending section and couples to the first aperture of the lid when engaged by the extending section, and a control panel having a plurality of inputs on an outer surface of the base unit for controlling operation of the motor and vacuum system.

In a specific embodiment, the vacuum system is configured to couple with the lid to draw a vacuum from the top of the container when activated. Also, the rotatable blade has a central body and a plurality of blending arms extending from the body. The blade is positioned at a center of a bottom surface of the container and attaches to a shaft which passes through the bottom surface.

In a specific embodiment of the blending blade, four arms extend from the central body, with two arms curving (or angling) upward, one arm curving (or angling) downward, and one arm being coplanar to the central body.

In an embodiment of the disclosed vacuum blender, a safety feature prevents activation of the blender blades when the lid is not properly seated on the container. A further safety feature may include dual safety switches within the control circuitry to prevent damage to the blender and its components.

In a further specific embodiment, the vacuum blender includes an enclosure attached to the base for completely enclosing the container. Preferably, the enclosure is comprised of a plurality of panels which together surround the container when positioned on the interface of the base, the enclosure further comprising a handle attached to at least one of the plurality of panels to move the at least one of the plurality of panels and provide access to an interior of the enclosure.

The vacuum blender may also comprise a hollow handle attached to the container and a port within the lid fluidly coupled to the air passage for draining condensation from the air passage.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS OF THE INVENTION

Figure 1:
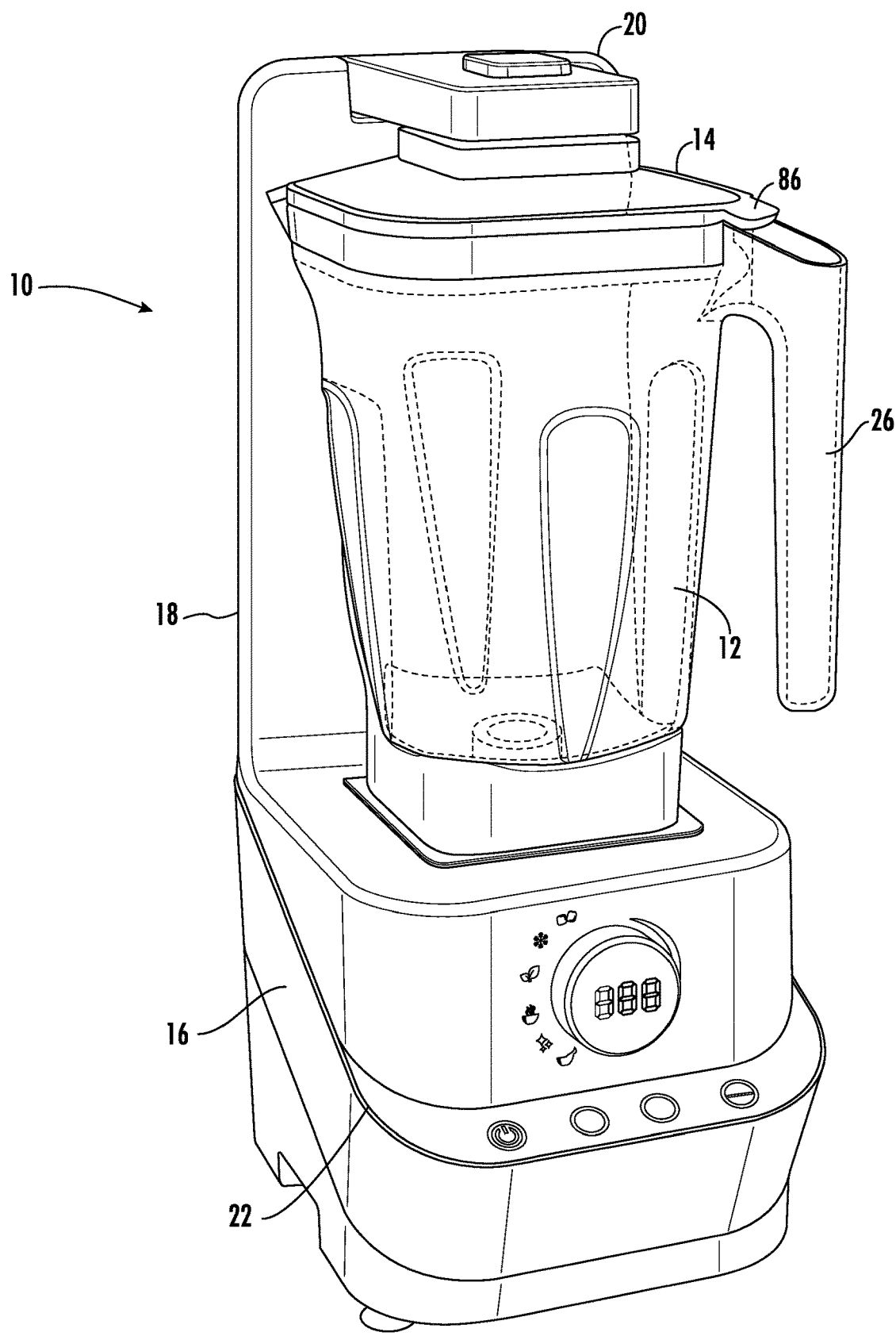
FIG. 1 is a perspective view of an embodiment of the disclosed vacuum blender.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-24, there are illustrated embodiments of a vacuum blender, generally designated by the numeral 10, including a control overlay 54, control circuitry 30 for operation of the blender and vacuum features, as well as other blender components. Generally speaking, the vacuum blender 10 includes a container 12, a lid 14, and a base 16 with an upward extending arm 18 housing a vacuum system 24.

Figure 2:
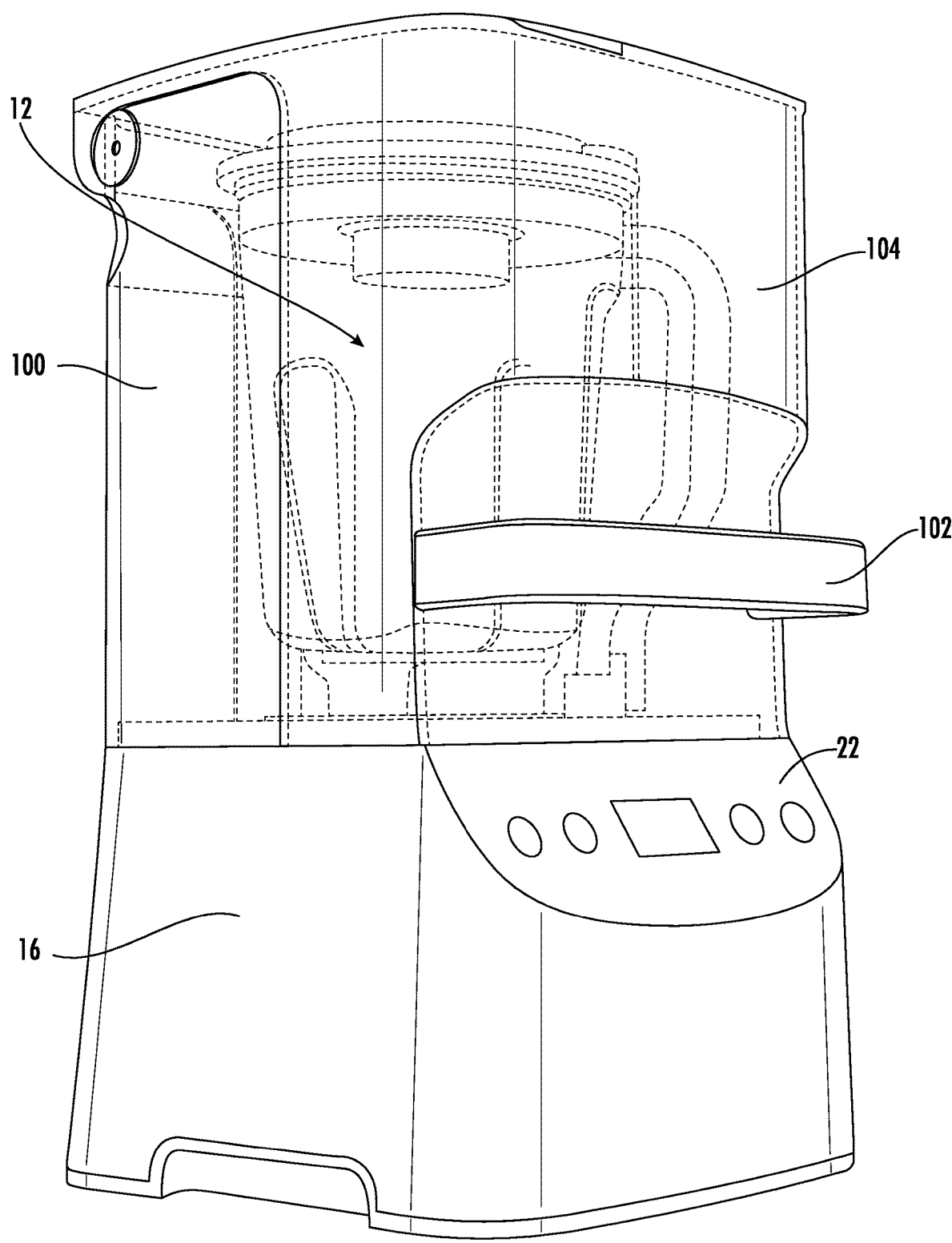
FIG. 2 is a perspective view of another embodiment of the disclosed vacuum blender having an operable enclosure.
Figure 3:
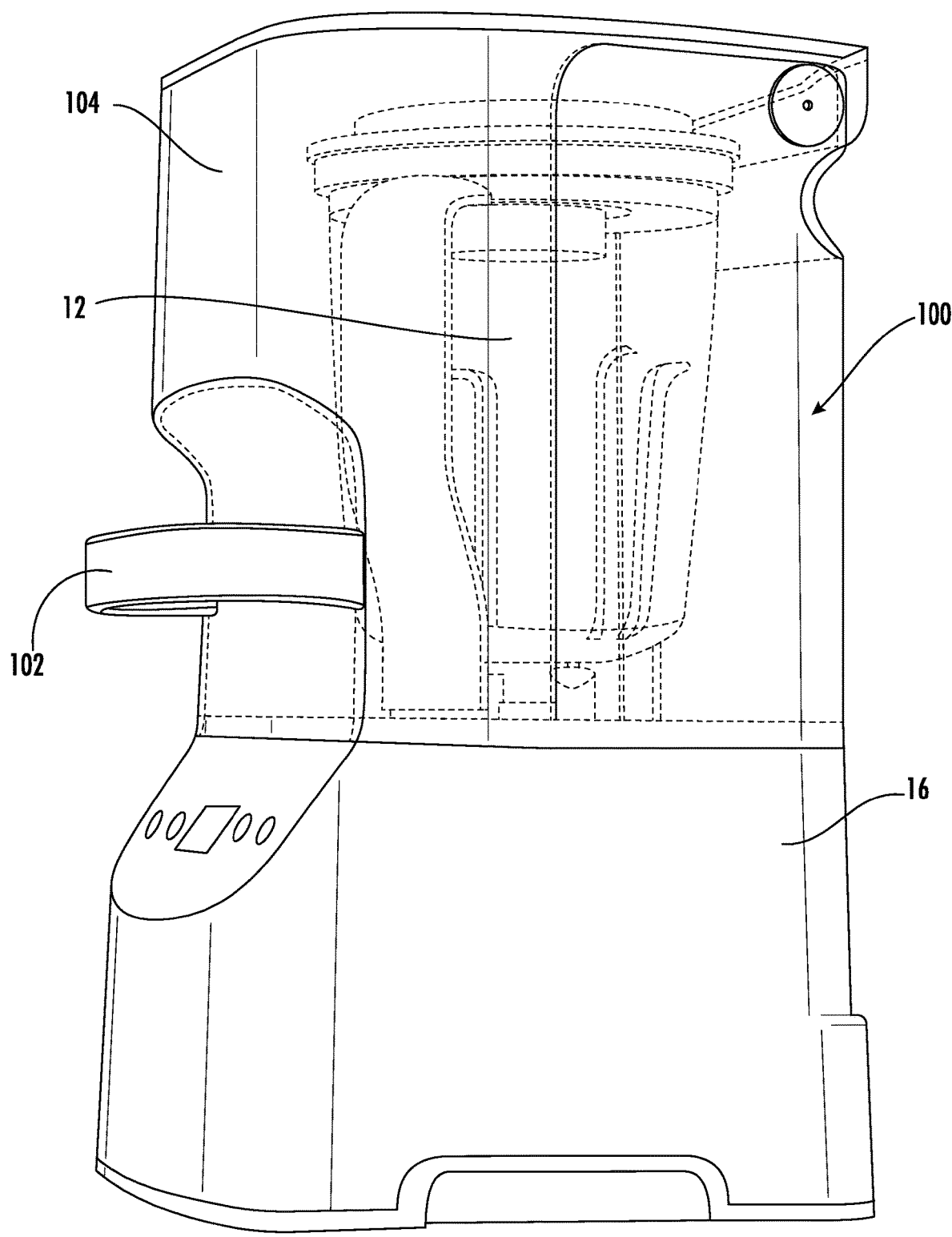
FIG. 3 is another perspective view of the embodiment of FIG. 2.
Figure 4:
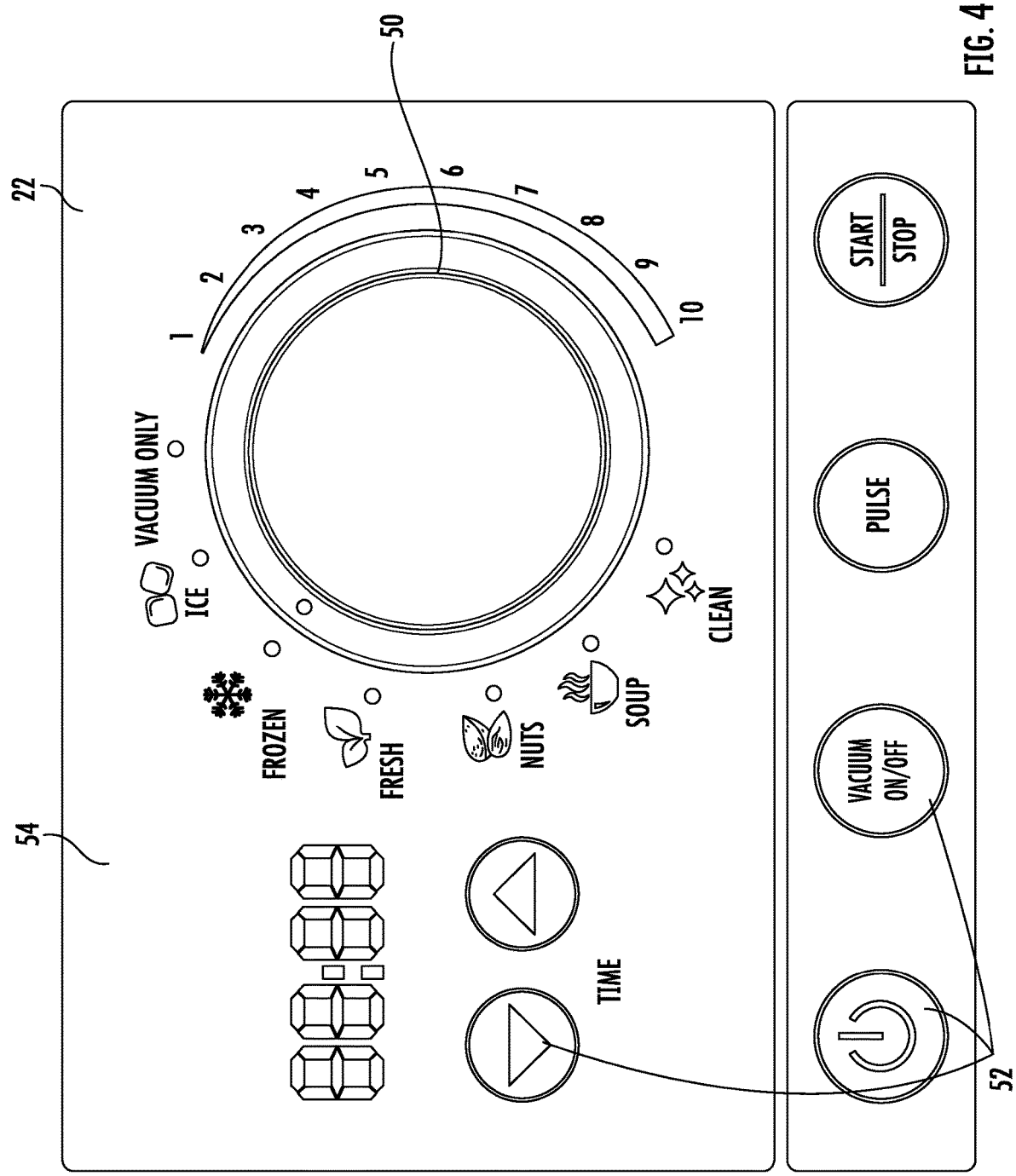
FIG. 4 is a front view of an embodiment of the control overlay for the vacuum blender of FIG. 1.
Figure 5:
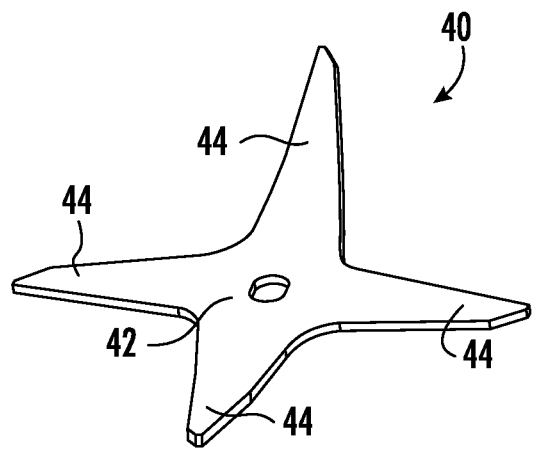
FIG. 5 is a perspective of a preferred blending blade configuration for the disclosed vacuum blender.
Figure 6:
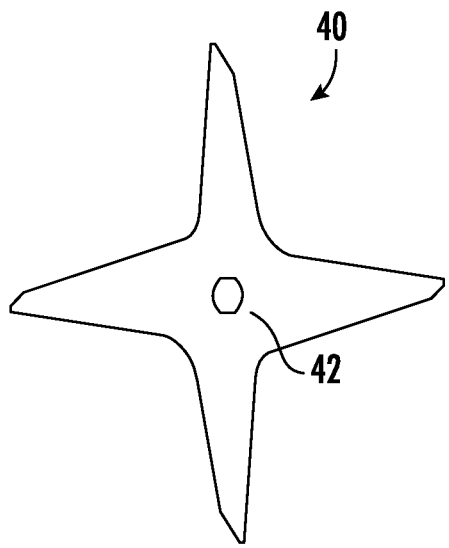
FIG. 6 is a top view of the blending blade of FIG. 5.
Figure 7:
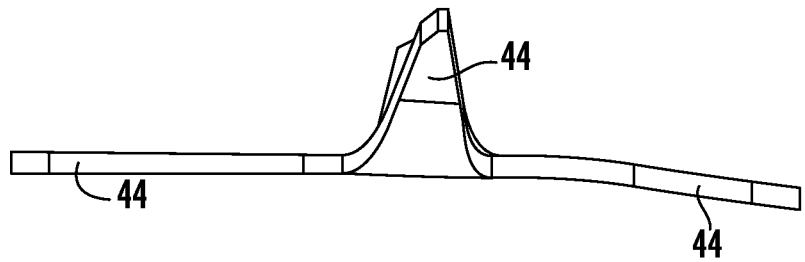
FIG. 7 is an elevated side view taken along a first longitudinal line of the blending blade of FIG. 5.
Figure 8:
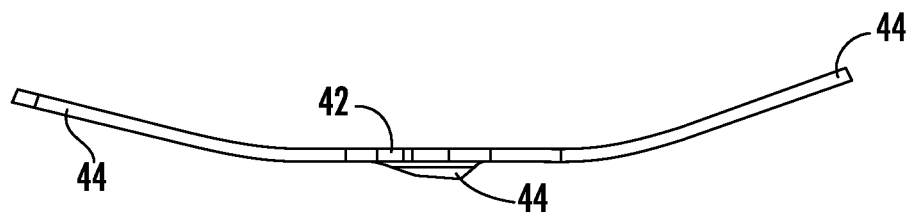
FIG. 8 is an elevated side view taken along a second longitudinal line of the blending blade of FIG. 5.

As illustrated in FIGS. 2 and 3, a preferred embodiment of the vacuum blender 10 includes an enclosure 100. The enclosure 100 is comprised of a series of side panels used to encase the container during blending. A handle 102 attached to a pivoting front panel 104 provides access to the interior of the enclosure 100. Preferably, the enclosure 100 friction fits to the base 16 and is removable there from, when desired.

The container 12 is used to hold ingredients to be blended. It is typically made of a durable plastic material, but may also be made from a suitable metal material. The container 12 is preferably graduated with indicia to facilitate the addition of liquid ingredients and portioning, as necessary. The container 12 should also include a handle 26 and pouring spout 32 for pouring a finished blended liquid. The container 12 is open at the top end 34 with suitable blender blades 40 removably secured in an opening at a lower end 36. The lid 14 is intended to completely cover and seal against the open end of the container 12. The lid 14 may be friction-fitted and/or include a latching mechanism (not shown) to secure the lid 14 in place during use. The lid 14 is also instrumental in a specific safety feature, described in further detail below.

The base 16 of the vacuum blender 10 houses a motor 38 for driving the blender blades 40, and a container interface 19 (FIG. 22) for operatively coupling the motor 38 to the blender blades 40. Additionally, the base 16 includes an upwardly extending arm 18 with a horizontally positioned end portion 20. As shown, the arm 18 creates an area into which the container 12 is positioned for use. The arm 18 also houses at least part of the vacuum system 24 which culminates with a vacuum opening and lid interface 47 on the underside of the horizontally positioned end portion 20 (see FIG. 23). The lid interface 47 couples with the previously described lid 14 to facilitate the vacuum feature of the blender 10, as will be described further below.

The base 16 also supports a user control interface 22, as shown in FIG. 2. The user control interface 22 is comprised of an overlay 54, a function selector knob 50 and several input and/or toggle buttons 52. The selector knob 50 allows a user to select between several pre-programmed operations of the vacuum blender 10, including vacuum operation and a self-clean function. The selector knob 50 also includes speed settings from 1-10 for standard blending operations. Of course, other selectable speed settings and functions could be made available.

The input buttons 52 include a power (on/off), vacuum (on/off), pulse (on/off), and blend time (min:sec) settings. Preferably, the buttons 52 are touch-sensitive operations, but toggle switches and push-button controls may be suitable.

TABLE 1 below identifies some of the pre-programmed options available with an embodiment of the disclosed vacuum blender 10. Obviously, other pre-programmed options could be used in place of or in addition to those set forth in TABLE 1.

TABLE 1

| Setting | Function | Time | Speed | Time | Speed | Time | Speed | Total | Pulse On |
|---|---|---|---|---|---|---|---|---|---|
| Vacuum | Used to pull all the Air out of the blending Chamber | | | | | | | | |

TABLE 1-continued

| Setting | Function | Time | Speed | Time | Speed | Time | Speed | Total | Pulse On |
|---|---|---|---|---|---|---|---|---|---|
| Ice | Blending of Frozen Berries and Sorbet, | 5 Sec | Low | 10 Sec | Med | 35 Sec | High | 50 Sec | Power Level 7 |
| Frozen | Blending of Ice based Drinks | 5 Sec | Low | 5 Sec | Med | 45 Sec | High | 55 Sec | Power Level 7 |
| Fresh | Blending of Fresh Ingredients Pesto, Ailoi, | 5 Sec | Low | 10 sec | High | 45 Sec | Med | 60 sec | Power Level 7 |
| Nut | Blending of Nuts, Almonds, Walnuts and Pecans | 5 Sec | Low | 25 Sec | Med | 30 sec | High | 60 Sec | Power Level 7 |
| Vegetable | Blending Fruit and Vegetables for Smooth Drinks | 5 Sec | Low | 10 Sec | Med | 35 Sec | High | 50 Sec | Power Level 7 |
| Soup | Brings Dishes to Hot serving temp | 5 Sec | Low | 55 Sec | High | | | 60 Sec | Power Level 7 |
| Clean | Self cleans in 60 sec with a drop of Soap | 10 Sec | Low | 45 Sec | High | 5 Sec | Low | 60 Sec | Power Level 7 |

Additionally, Table 2 below explains use of the button settings of an embodiment of the disclosed vacuum blender 10. Again, many other button settings may be possible.

TABLE 2

| BUTTON | FUNCTION |
|---|---|
| On/Off | Press to Power Machine |
| Vacuum | Press to Switch Vacuum On and Off, cannot be pressed during a blending Cycle |
| Pulse | Press and Hold to Pulse machine, control Knob must be at a power level to pulse. |
| Start/Stop | Press to begin Preset Functions, Control knob must be in one of the 6 preset modes or Power level to start Machine. |
| Time | Used to set timer (Cannot Exceed Max run time of Motor) |
| Up Arrow | Adjust time Up |
| Down | Adjust time Down |
| Countdown Timer | Use up down arrows to adjust time in Cycle, control knob must be at a power level to operate |

***At the end of each pre-programmed cycle, there will be a default setting of (power level 7) to be able to pulse to modify and get to desired results
***Do not allow count timer to exceed max run time.

The vacuum blender 10 also includes a vacuum system 24 for drawing a vacuum on the container 12, usually when all ingredients are present. The vacuum system 24, including a vacuum motor 60 and vacuum tubing 62, is housed within either the base 16 and/or the vertical extension arm 18 attached to the base 16. The vacuum motor 60 is operated from the user control interface 22, as described above, and when operated, draws a vacuum on the container 12 via the lid interface 47. Accordingly, it is important that the seal between the lid 14 and the container 12 be tight without any significant leaks.

Figure 9:
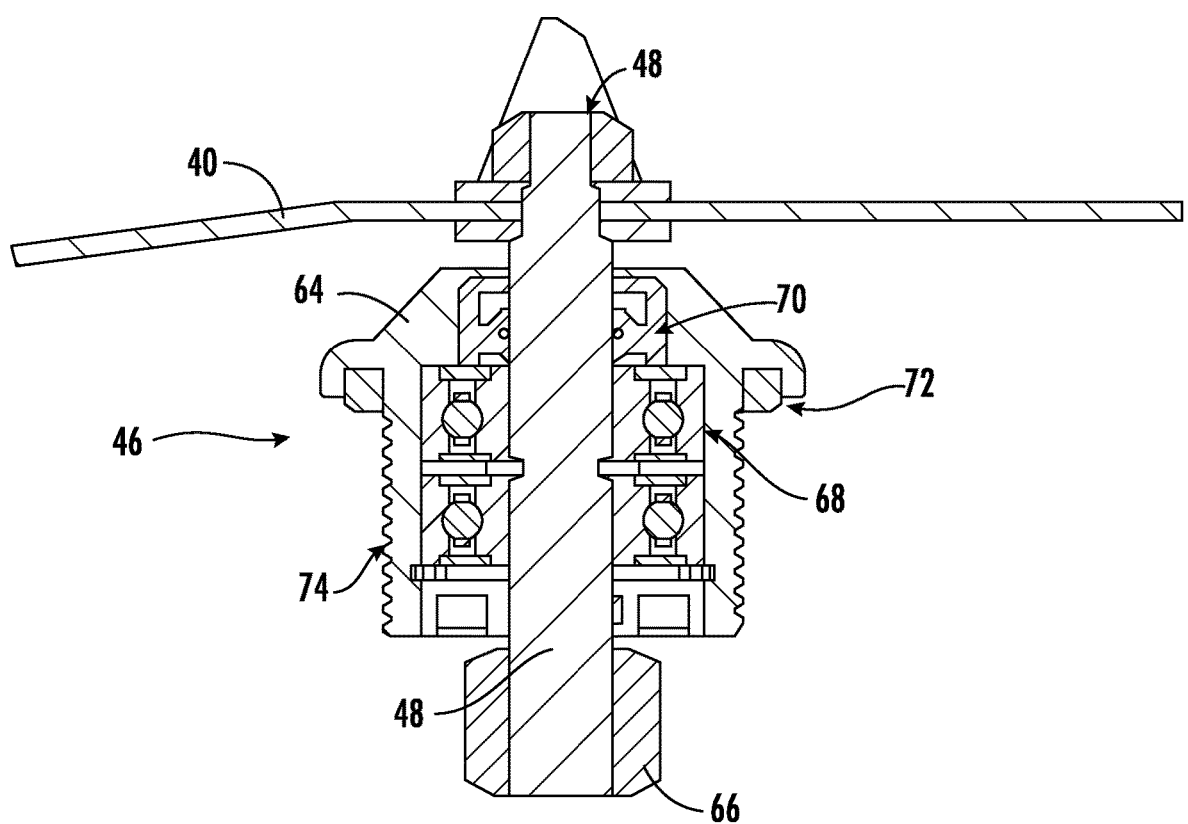
FIG. 9 is a side view of an embodiment of the blending blade and seal assembly.
Figure 10:
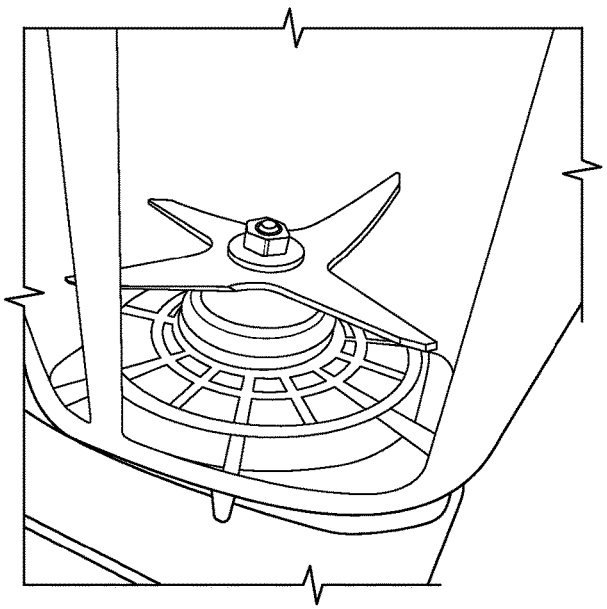
FIG. 10 is a perspective view showing an embodiment of the blending blade positioned within the vacuum blender container.
Figure 11:
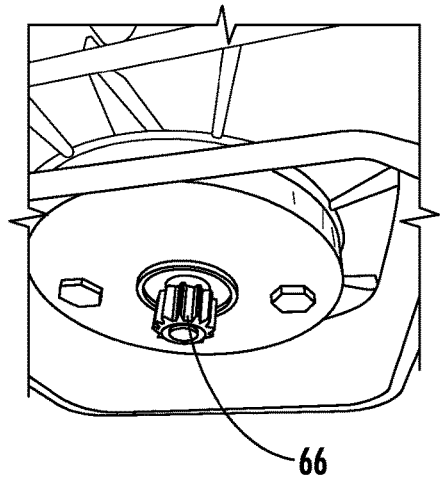
FIG. 11 is a bottom view of an embodiment of the connector for linking the rotatable blending blade to the motor in the blender base.
Figure 12:
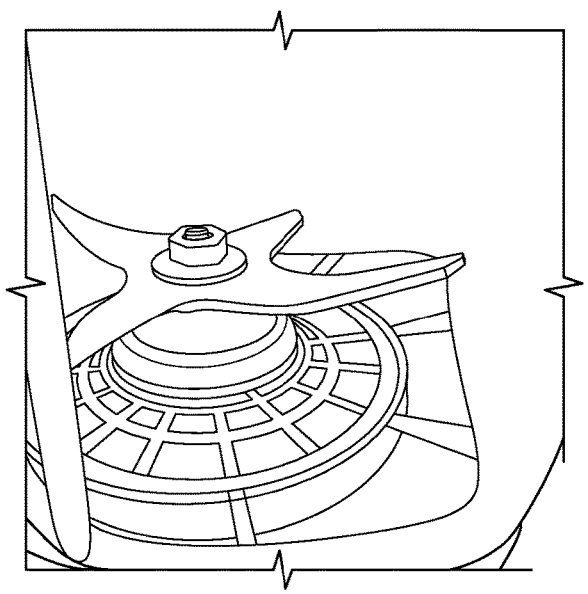
FIG. 12 is a side view of the blending blade of FIG. 10.
Figure 13:
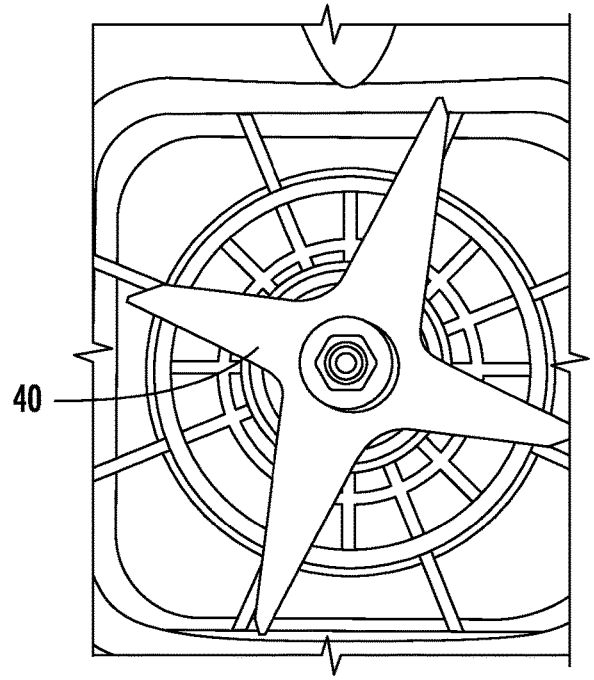
FIG. 13 is a close up top view of the blending blade of FIG. 10.
Figure 14:
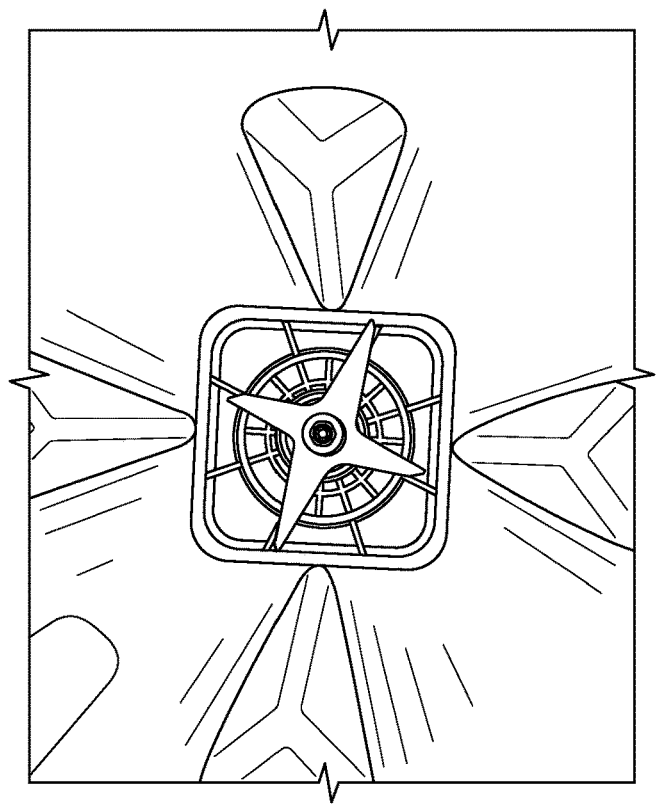
FIGS. 14 and 15 are top views of an embodiment of the container interior and the blending blade.
Figure 15:
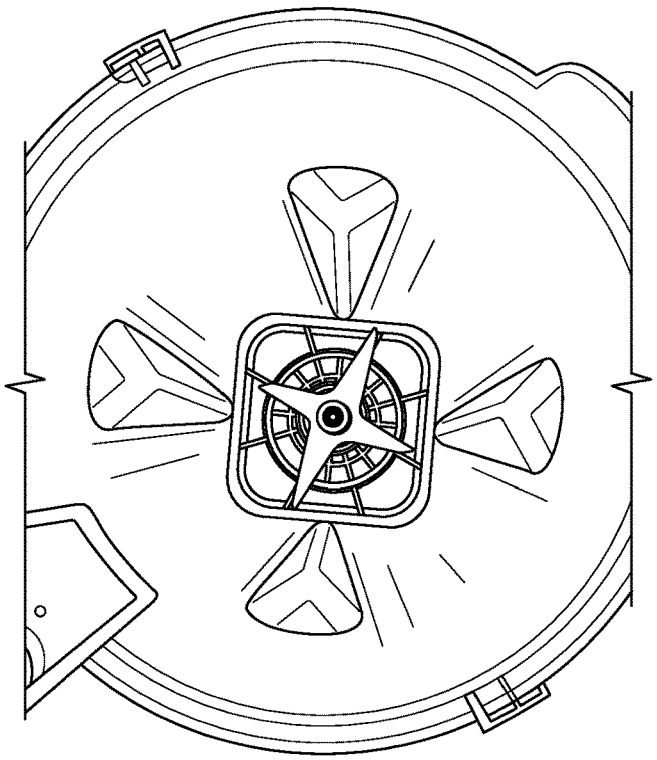
Figure 16:
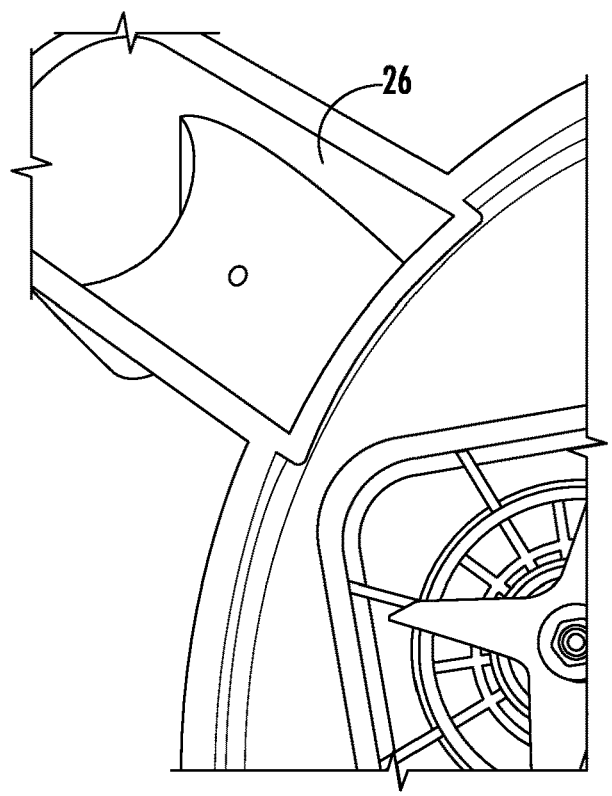
FIGS. 16 and 17 are top views of an embodiment of a hollow handle on the container.
Figure 17:
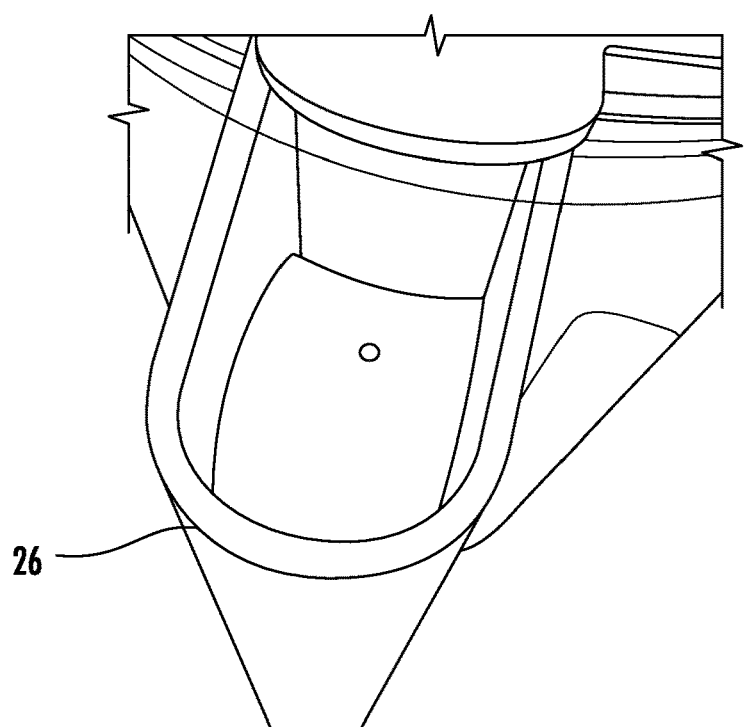

Referring to FIGS. 5-9, the preferred blending blade 40 is shown. The blade 40 includes four cutting arms 44 sharpened on a leading edge and attached to a central body 42. The blade design is believed to create a more desirable food blend over prior art blades as a result of the use of thicker blade arms. The arms 44 are configured with two arms angled upward, one angled downward and one coplanar to the central body 42. As shown in FIG. 9, a blade and seal assembly 46 is used to prevent leakage from the container 12. The body 42 connects to a shaft 48 which passes through a bearing and seal housing 64 and then ends with a connector 66 to provide a useful linkage to a motor connector (not shown), accessible on the interface 19. The bearing and seal housing 64 includes an internal bearing 68 to allow rotation of the shaft 48, while an inner sealing ring 70 having three contact points with the shaft 48 prevents leaks into the assembly 46. The inner sealing ring is preferably comprised of a fluoro-rubber silicone blend material. An outer seal ring 72 provides a tight seal against the container bottom, biased by the tightening of an assembly nut (not shown) on the threaded exterior 74 of the housing 64.

Figure 18:
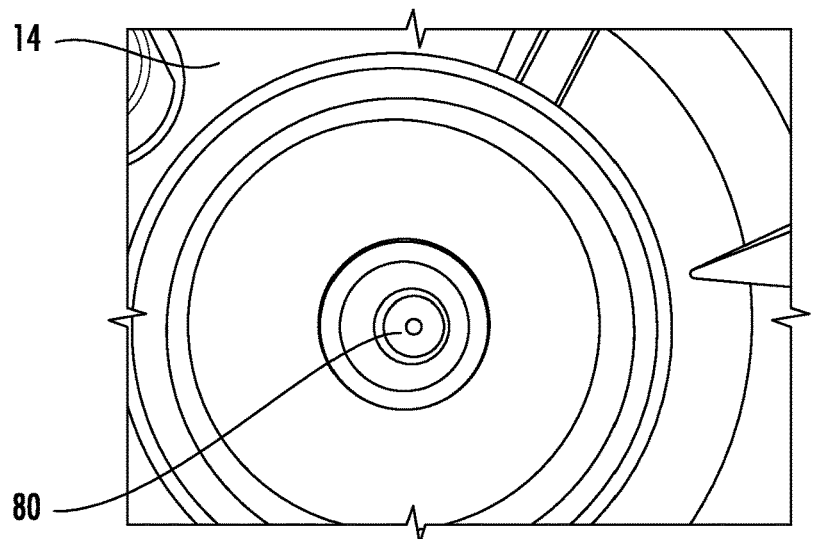
FIG. 18 is a top view of an embodiment of the vacuum blender lid showing the connector for a vacuum line.
Figure 19:
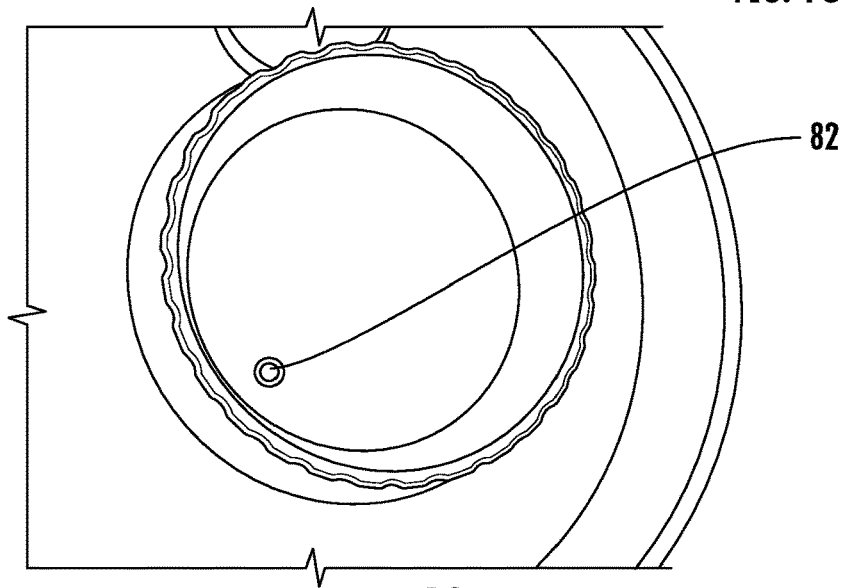
FIGS. 19 and 20 are bottom views of the lid of FIG. 18 showing an aperture on the bottom surface through which air is drawn from the container during use.
Figure 20:
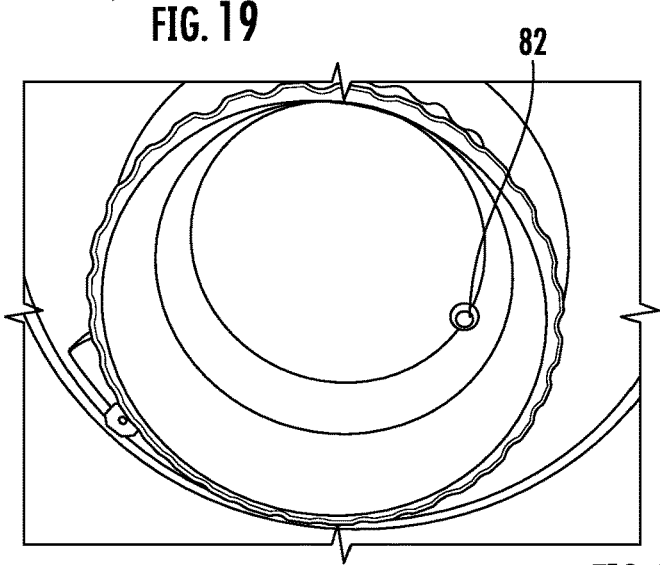
Figure 21:
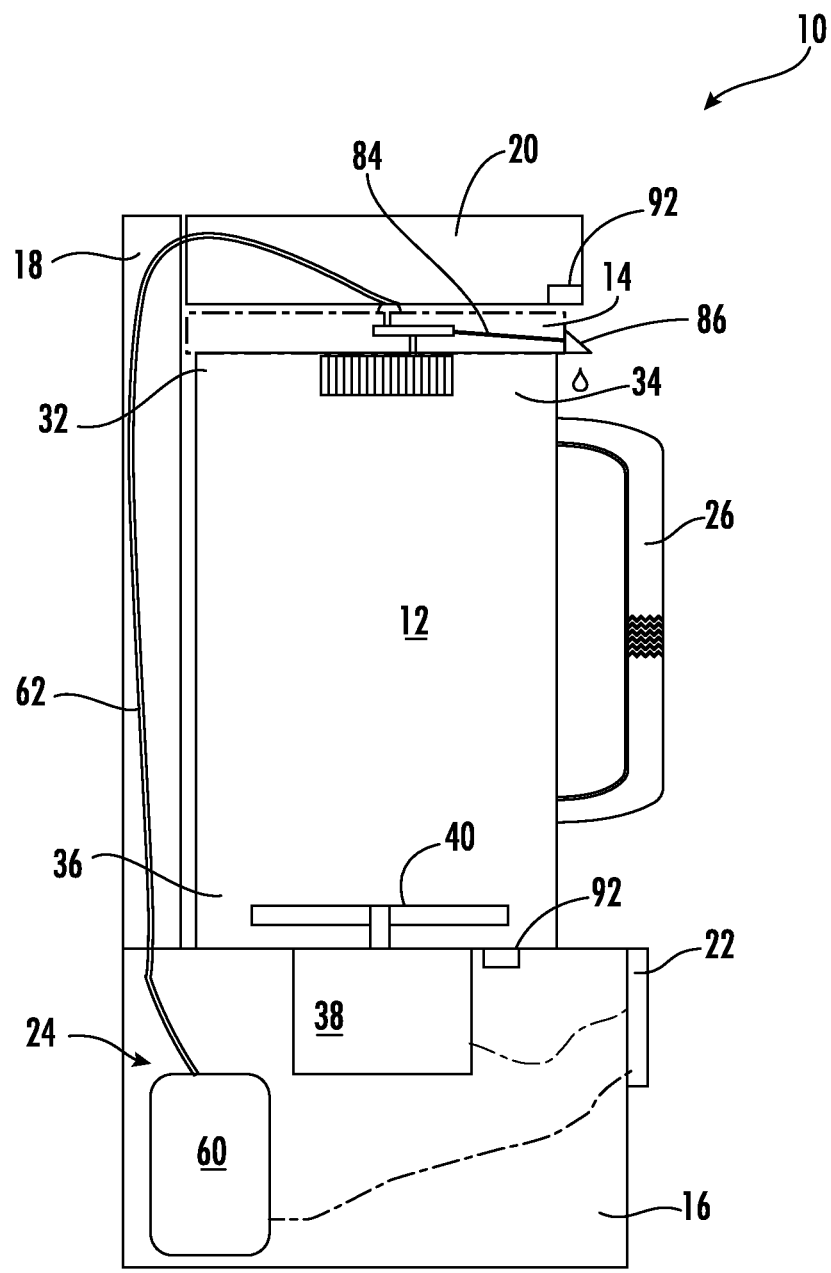
FIG. 21 is a schematic of the vacuum blender illustrating the positions of the motor and vacuum system within the base.
Figure 22:
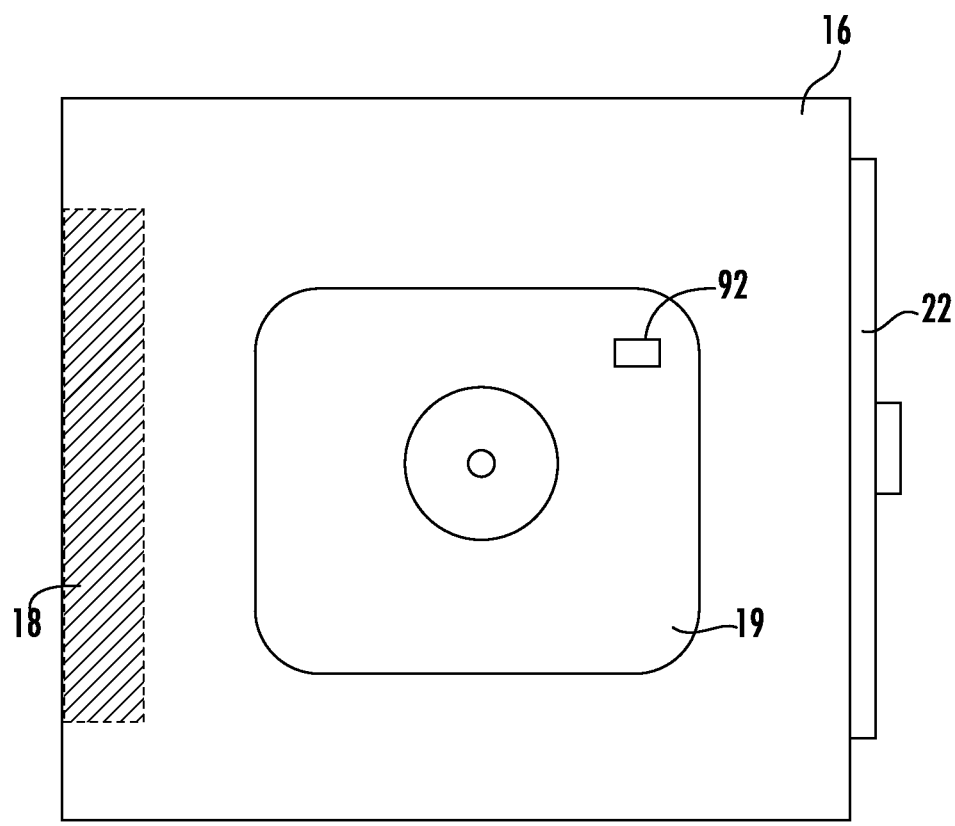
FIG. 22 is a top cut-away view of an embodiment of the base.
Figure 23:
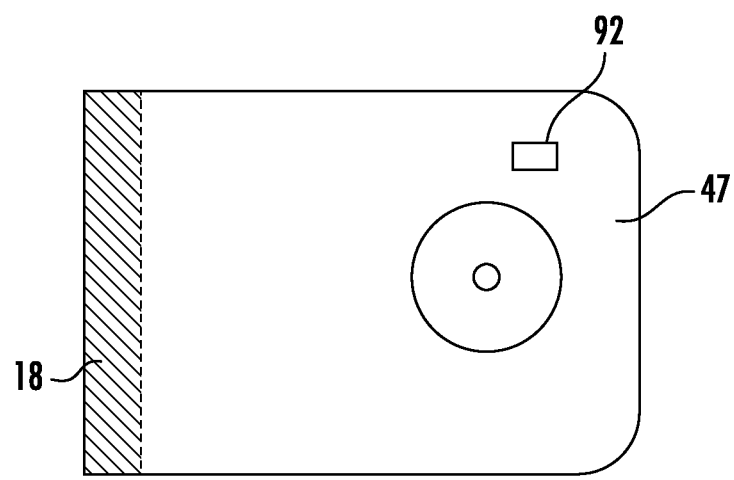
FIG. 23 is a bottom cut-away view of an underside of the lid interface.

As shown in FIGS. 18 and 19, the lid includes an upper orifice 80 which couples to the interface 47 on the underside of the end portion 20 of the arm 18 (see FIG. 23) to extend the vacuum line into the container 12. Another lower vacuum orifice 82 on the underside of the lid 14 is offset from the upper orifice 80 to prevent drawing any liquids into the vacuum line. As a further precaution, a drain line 84 which allows any liquids pulled into the vacuum line 62 of the lid 14 to be discharged. Preferably, the drain line 84 opens at a port 86 just over the hollow container handle 26, which can be used to collect the liquid for later disposal. To reduce the likelihood of liquid in the vacuum line, the vacuum is prevented from operation during blending.

To facilitate opening, a small vacuum release opening may be provided to discharge the vacuum after blending. This will allow easier removal of the lid 14 for pouring of the blended material.

Also, as a safety measure, neither the blending or vacuum operations can be commenced when the lid 14 and container 12 combination are not properly seated within the base 16 and arm 18. Both the container interface 19 with the blender motor 38 of the base 16 and the lid interface 47 with the vacuum system 24 of the horizontal portion of the arm 18 should include sensing/safety mechanisms to prevent operation when no blender or lid is sensed, or when an improper seating of the container or lid is sensed. Such mechanisms could include a switch 92, as is well-known in the art, to determine the presence or absence of a vital component.

Figure 24:
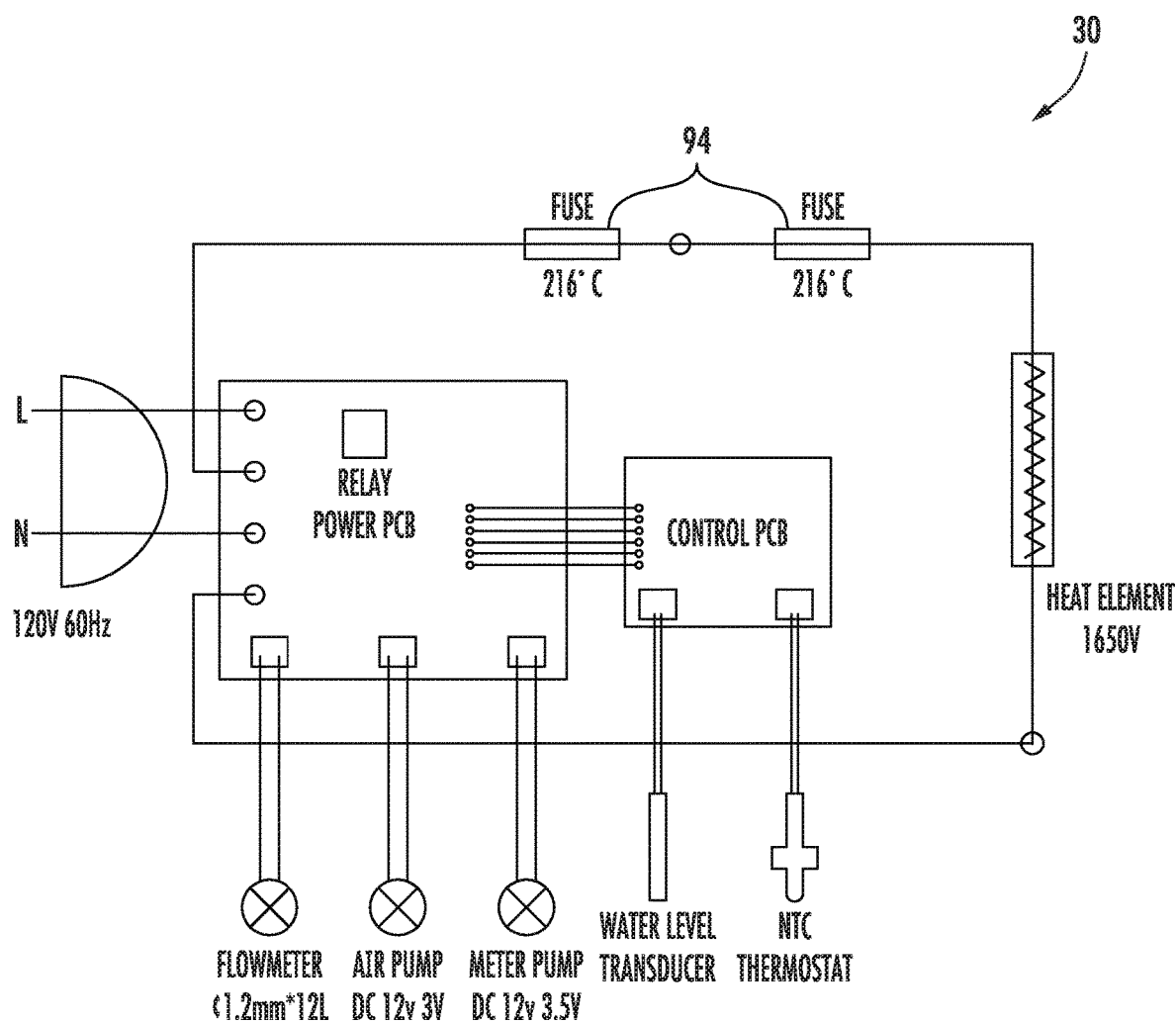
FIG. 24 is a schematic of an embodiment of the control circuitry.

Finally, as shown in FIG. 24, a preferred control circuitry schematic shows the controls having not one, but two safety fuses 94. The redundant fuse configuration significantly reduces the possibility of motor overload and overheating during operation.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A vacuum blender system comprising:
   a container for holding ingredients to be blended, the container being open at a top end;
   a rotatable blade having a central body and a plurality of blending arms extending from the body, the rotatable blade being positioned at a center of a bottom surface of the container and attached to a shaft which passes through an opening in the bottom surface;
   a lid configured to completely cover the open end of the container, the lid having a first aperture on a first surface of the lid and a second aperture on a second surface of the lid, the first and second apertures being fluidly connected by an air passage through the lid;
   a base unit comprising:
      a motor housed within a first housing section of the base unit;
      an interface positioned on an outer surface of the first housing section of the base unit for engaging the bottom surface of the container during use, the interface having a connector driven by the motor and configured to couple with the shaft when the container is properly positioned on the interface;
      a second housing section extending upward from the first housing section and configured to engage the lid during use;
      a vacuum system for effecting a vacuum within the container, the vacuum system comprising a vacuum pump and an air line connected by one end to the pump and having a connector attached at an opposing end, wherein the connector is positioned within the second housing section and couples to the first aperture of the lid when engaged by the second housing section; and
      a control panel having a plurality of inputs on an outer surface of the base unit for controlling operation of the motor and vacuum system;
   an enclosure attached to the base and comprising a plurality of panels which together surround the container when positioned on the interface of the base, the enclosure further comprising a handle attached to at least one of the plurality of panels to move the at least one of the plurality of panels and provide access to an interior of the enclosure.

2. The vacuum blender of claim 1, further comprising a hollow handle attached to the container and a port within the lid fluidly coupled to the air passage for draining condensation from the air passage.

3. The vacuum blender of claim 1, further comprising a safety switch for detecting when the lid is properly secured to the container.

4. The vacuum blender of claim 1, wherein the vacuum system reduces a volume of air in the container to prevent oxidation.

5. The vacuum blender of claim 1, wherein the enclosure is removable from the base.

6. The vacuum blender of claim 5, wherein the enclosure friction fits to a portion of the base.

7. The vacuum blender of claim 1, wherein the control panel comprises preset inputs for the vacuum system.

8. The vacuum blender of claim 1, wherein the control panel comprises preset inputs for the motor.

9. The vacuum blender of claim 7, wherein the control panel comprises preset inputs for the vacuum system and the motor.

10. The vacuum blender of claim 1, wherein the central body is within a plane and the rotatable blade comprises four blending arms equally spaced about the central body with only one blending arm being entirely coplanar with the central body.

11. The vacuum blender of claim 10, wherein two blending arms extend in a first direction relative to a plane of the central body and one blending arm extends in a second direction relative to the plane of the central body, the first direction being opposite to the second direction.

12. The vacuum blender of claim 1, further comprising a liquid seal about the shaft to prevent fluid from exiting the container through the opening in the bottom surface.

13. The vacuum blender of claim 12, wherein the liquid seal comprises at least three points of contact with the shaft.

14. The vacuum blender of claim 13, wherein the liquid seal is comprised of a fluoro-rubber silicone blend material.

15. The vacuum blender of claim 14, wherein the fluoro-rubber silicone blend comprises a FKM silicone blend.

16. A vacuum blender system comprising:
   a container for holding ingredients to be blended, the container being open at a top end;
   a rotatable blade having a central body and a plurality of blending arms extending from the body, the rotatable blade being positioned at a center of a bottom surface of the container and attached to a shaft which passes through the bottom surface;
   a lid configured to completely cover the open end of the container, the lid having a first aperture on a first surface of the lid and a second aperture on a second surface of the lid, the first and second apertures being fluidly connected by an air passage through the lid; and
   a base unit comprising:
      a motor housed within a first housing section of the base unit;
      an interface positioned on an outer surface of the first housing section for engaging the bottom surface of the container during use, the interface having a connector driven by the motor and configured to couple with the shaft when the container is properly positioned on the interface;
      a second housing section extending upward from the first housing section and configured to engage the lid during use;
      a vacuum system for effecting a vacuum within the container, the vacuum system comprising a vacuum pump and an air line connected by one end to the pump and having a connector attached at an opposing end, wherein the connector is positioned within the second housing section and couples to the first aperture of the lid when engaged by the second housing section; and
      a control panel having a plurality of inputs on outer surface of the base unit for controlling operation of the motor and vacuum system;
   an enclosure frictionally attached to the base unit to completely enclose the container when positioned on the interface.

17. The vacuum blender of claim 16, wherein the enclosure comprises a plurality of panels which together surround the container when positioned on the interface of the base.

18. The vacuum blender of claim 17, wherein the enclosure further comprises a handle attached to at least one of the plurality of panels to move the at least one of the plurality of panels and provide access to an interior of the enclosure.

* * * * *